Dec. 7, 1948.  F. B. PORGES  2,455,700
MECHANICAL SEAL
Filed Dec. 30, 1946
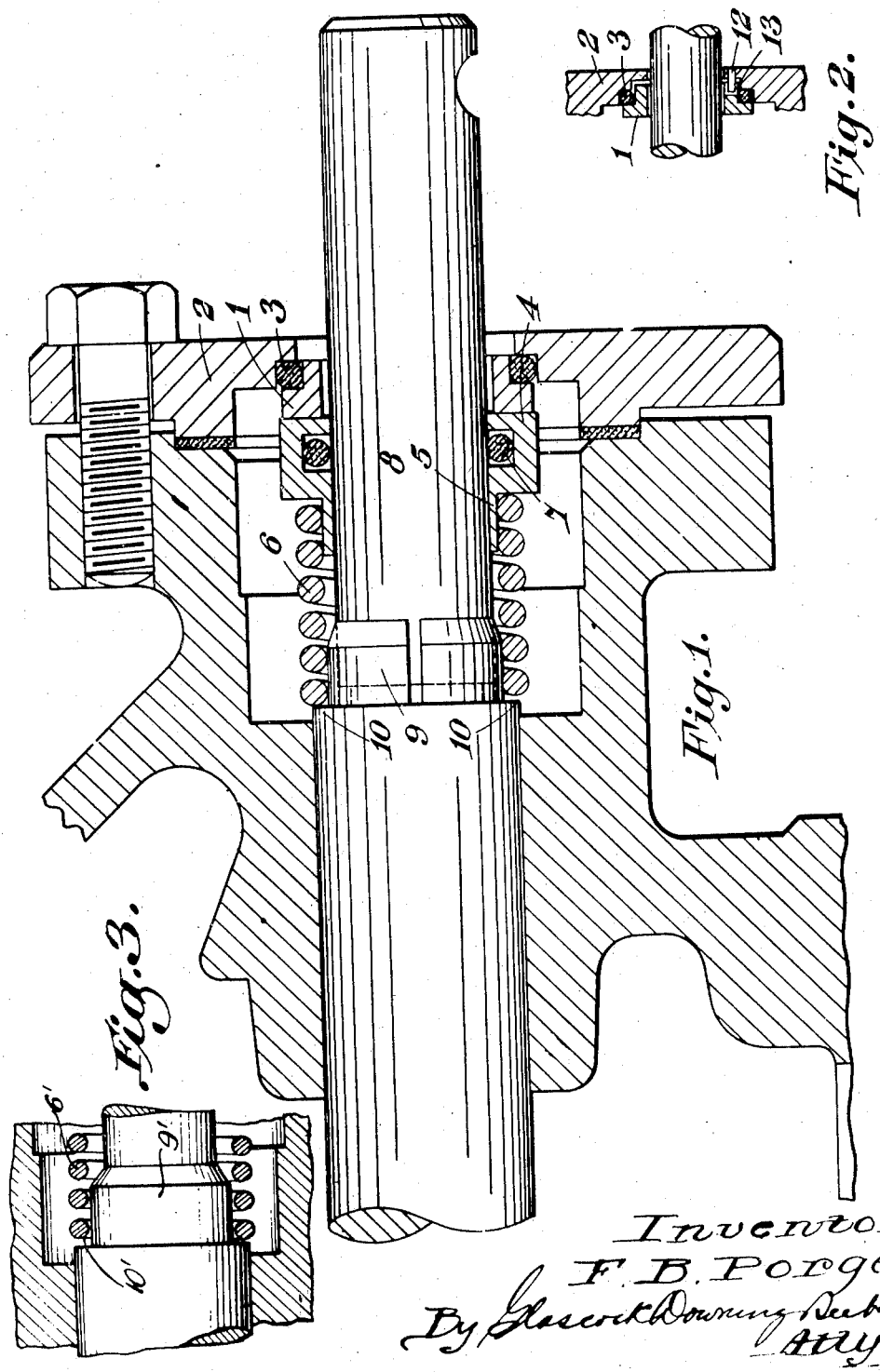
Inventor
F. B. Porges
By Glascock Downing Seebold
Attys Patented Dec. 7, 1948

2,455,700

REISSUED

UNITED STATES PATENT OFFICE 2,455,700

MECHANICAL SEAL

Frederick Benjamin Porges, Manchester, England, assignor to Flexibox Limited, Manchester, England, a British company Application December 30, 1946, Serial No. 719,153
In Great Britain November 22, 1946

4 Claims. (Cl. 286—11.15)

This invention relates to mechanical seals for making a fluid or gastight joint between a revolving shaft and a stationary surface and has for its object to provide an improved mechanical seal which is compact, simple to assemble and maintain and capable of being readily fitted in place of an existing mechanical seal.

It is known to provide a mechanical seal for making a fluidtight joint between a revolving shaft and a stationary surface in which a spring bears at one end against a shoulder on the shaft and at the other end against a ring around the shaft having a static seal located in an internal recess in said ring, which makes frictional engagement with said ring and the shaft so as to ensure that the ring revolves with the shaft. This rotary seal ring is pressed by the spring against the stationary seal ring which is held against rotation.

It is important to prevent any scoring of the shaft by the spring when the latter is being passed along the shaft during the assembly of the seal and it is also important that the rotary seal ring should not have any rotary movement relatively to the shaft, as such movement will result in the static seal within the ring or the ring itself gradually scoring the shaft which will result eventually in the failure of the rotary seal. It is important also to prevent the stationary seal ring from rotating in the cover which would have similar consequences.

The object of the present invention is to provide an improved construction of rotary seal in which the above points are effectively dealt with.

In accordance with my present invention, the spring has sleeve like parts projecting and fitting into its opposite ends, one part (by which the spring is revolved) being adjacent to the shoulder on the shaft against which the end of the spring bears and the other part being in the form of a sleevelike extension of the rotary seal ring which revolves with the shaft and which bears against the stationary seal ring, the spring being an interference fit on said sleeves and its convolutions being of such hand (i. e. right or left hand) that any tendency of the rotary seal ring to turn relatively to the shaft causes the spring to be wound up and so close upon and grip such sleeves more tightly and thus resist such turning. By interference fit hereinbefore mentioned is meant that before interfitting the parts, the external diameter of the male part is always larger than the internal diameter of the female part.

Referring to the accompanying explanatory drawings:

Figure 1 is a sectional elevation of a mechanical seal constructed and arranged in accordance with this invention. Figure 2 shows a modification. Figure 3 is a fragmentary sectional elevation of a further modification.

The seal comprises a stationary seal ring 1 between a shoulder on which and a shoulder on the fixed cover 2 is a static seal 3, which may be made of synthetic rubber, which forms a resilient cushion for the seal device, makes a leakproof joint between the ring 1 and the cover 2, and exerts sufficient friction on the ring 1 in service to prevent the ring from rotating in the cover 2. If desired a pin 12 may be provided in the cover 2 which enters a slot 13 in the stationary seal ring 1 to ensure that the latter does not turn (see Figure 2).

The rotary seal ring 4 has a sleevelike extension 5 upon which one end of the spring 6 has an interference fit. Within the ring 4 is a static seal 7, which may be made of synthetic rubber, and which fits in a groove in the ring 4 so preventing any leakage along the surface of the shaft 8. The other end of the spring 6 has an interference fit on the split collar 9 which grips the shaft adjacent to the shoulder 10 on the shaft against which the end of the spring bears. If desired the shaft itself may have a thickened portion as shown at 9' in Fig. 3 which has an interference fit with the end of the spring 6' adjacent to the shoulder 10'.

The hand (i. e. right or left) of the spring 6 is such that any movement of the ring 4 relatively to the shaft 8 due to the frictional resistance between the two rings 4 and 1 will cause the sleevelike projection 5 to twist the spring in a direction which tightens its convolutions and so increases its grip on both ends with the result that relative movement of the ring 4 on the shaft 8 is effectively prevented. It is to be noted that the coil spring and the interference fits constitute a sole means for causing the seal ring to turn with the revolving member.

The spring 6 therefore effectively drives the seal ring 4 at all times and obviates any scoring of the shaft by the static seal 7. As the bore of the spring 6 is much greater than the diameter of the shaft 8, there is little possibility of the shaft being scored when the spring is being placed in position thereon.

It will be seen that the rotary seal ring fits a plain shaft and that the installation of the device requires no tools except those for the studs securing the cover 2.

What I claim is:

1. A mechanical seal for making a fluidtight joint between a revolving member and a stationary surface comprising, in combination, a coil spring around the revolving member, a rotary seal ring around the revolving member, a stationary surface against which the rotary seal ring bears under the pressure of said spring, characterised in, that one end the spring has an interference fit with a part of the revolving member and the other end an interference fit with a part of the rotary seal ring, the convolutions of the spring being of such hand with respect to the direction of rotation that any tendency of the rotary seal ring to turn relatively to the revolving member causes the spring to more tightly grip the parts which have interference fits with its ends and resist such tendency, the coil spring and interference fits constituting a sole means for causing the seal ring to turn with the revolving member.

2. In a mechanical seal as claimed in claim 1, a stationary seal ring between the rotary seal ring and the stationary surface, a static seal between the stationary seal ring and the stationary surface, and a pin extending between the stationary seal ring and stationary surface to prevent relative turning movements thereof.

3. In a mechanical seal as claimed in claim 1, a sleeve around and revolving with a shaft constituting the revolving member, the sleeve having a thickened part which is an interference fit with the end of the spring.

4. A mechanical seal as claimed in claim 3 in which the sleeve is in the form of a split collar.

FREDERICK BENJAMIN PORGES.

REFERENCES CITED

The following references are of record in the file of this patent:

UNITED STATES PATENTS

| Number | Name | Date |
|---|---|---|
| 1,958,246 | Olson | May 8, 1934 |
| 2,411,509 | Endebak | Nov. 26, 1946 |